A. P. JURGENSEN.
SHUTTER FOR MOTION PICTURE MACHINES.
APPLICATION FILED JAN. 19, 1918.
1,299,956.
Patented Apr. 8, 1919.
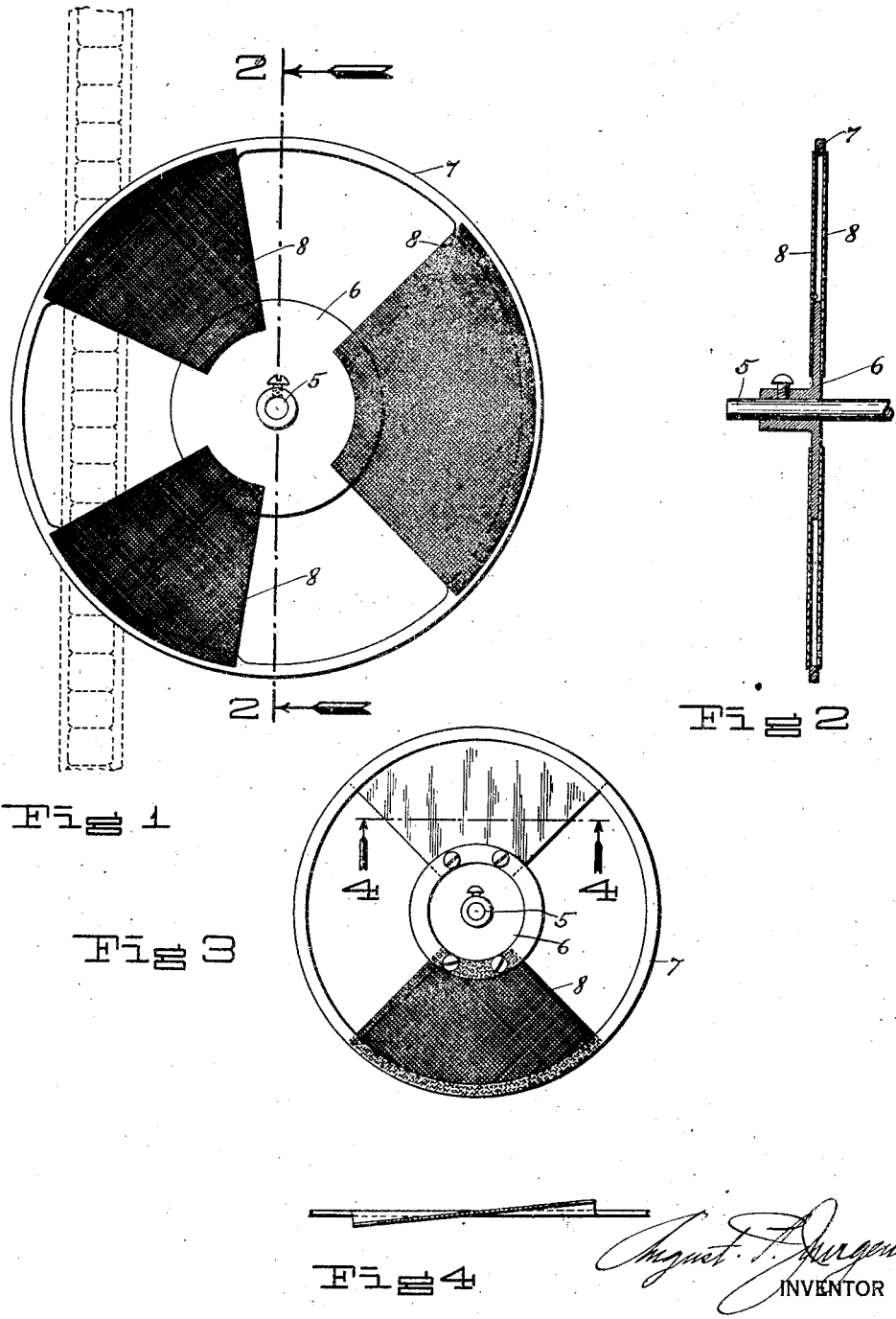

UNITED STATES PATENT OFFICE.

AUGUST P. JURGENSEN, OF NEW YORK, N. Y.

SHUTTER FOR MOTION-PICTURE MACHINES.

1,299,956.  Specification of Letters Patent.  Patented Apr. 8, 1919.

Application filed January 19, 1918. Serial No. 212,684.

*To all whom it may concern:*

Be it known that I, AUGUST P. JURGENSEN, a citizen of the United States, residing at 2465 Broadway, in the city, county, and State of New York, have invented certain new and useful Improvements in Shutters for Motion-Picture Machines, of which the following is the specification.

This invention relates to shutters for use with motion picture projecting apparatus and has for its object to provide a substitute for the shutter blades now generally used. Shutter blades for this purpose are usually opaque, although it has been proposed to employ in place of the opaque blade, a blade made of frosted glass or the like with the idea that the use of this blade would avoid the extreme contrast between full light and full darkness in the operation of the machine. Such glass shutters however are open to the objection that they will necessarily refract the light passing through them, and furthermore their comparatively great weight is a serious disadvantage because of the centrifugal force generated in the rotation of the shutter, the likelihood of breakage, with consequent danger to the attendant, and the extreme difficulty of properly balancing a heavy shutter.

I propose to employ a shutter which will diffuse the light passing through it, so that instead of alternate extremes of light and dark on the screen there will be full light when no blade is in front of the light and a slightly reduced and blurred effect when the blade is in front of the light. For this purpose I prefer to employ as the material of the shutter blade or vane one or more thicknesses of foraminated material, such as fine wire mesh.

In the accompanying drawings in which I have shown a merely illustrative form of the invention, Figure 1 is a front view of a shutter embodying my invention, showing its relation to the traveling film; Fig. 2 is a sectional view taken on the line 2—2 of Fig. 1; Fig. 3 is a view of a modification; and Fig. 4 is a section on the line 4—4 of Fig. 3.

Referring to the numerals on the drawings, there is shown at 5 the usual shutter shaft having a hub 6, while 7 indicates the rim portion of the shutter. Between the rim and the hub or hub flange are secured vanes 8, which comprise one or more thicknesses of foraminated or reticulated material, two thicknesses being shown in Figs. 1 and 2. I prefer to use very fine wire mesh, and if desired I may provide an additional thickness or thicknesses along the radial edge portions of the vanes. The vanes will of course be of the proper size and arrangement to accomplish the desired result, and it is to be understood that one of these vanes will be in front of the film while the latter is moving, so that the light coming through the moving film, and passing through the reticulated or foraminated material of the vane will reach the screen as a blur, but without substantial diminution of light. There will be no refraction from the vane, because it does not possess the optical quality of refraction. In Figs. 3 and 4 I have shown how these vanes may be given a slight inclination after the manner of a fan blade, so that in the operation of the shutter a current of air will be set up which will carry away heat from the machine and also add to the comfort of the operator.

It will be understood that the material of the vane is secured to the rim and to the hub or hub extension in any preferred way as by means of soldering. A good way of assembling would be to cut a piece of wire mesh in the proper shape, so that it could be bent around the rim, with its ends overlying the hub extension, and then soldered in place on both the hub extension and the rim. The shutter will obviously be very light in weight, substantially as light as the ordinary opaque shutter now generally employed, and therefore the problems of breakage and loss of balance, with consequent racking of the mechanism are eliminated, while all the advantages of diffusion of light without diminution of the light while the film is moving are avoided, without refraction of the light.

I claim:

A motion picture shutter including a hub, a rim, and at least two light-deflecting blades arranged between the hub and rim and spaced from each other around the rim; each blade, in that part of the blade coacting with the light-pencil passing through the film during rotation of the shutter, including at least two very thin opaque metallic sheets, each sheet having a multiplicity of small closely spaced openings to act according to the laws of lightway openings in diffraction gratings, the two sheets of the two blades, in that part of each blade coacting with the light-pencil passing through the film during rotation of the shutter, being spaced apart a distance so calculated as to avoid practically any diminution of the light adapted to be transmitted through a blade on a screen, to avoid flicker, and at the same time to permit the two sheets of each blade to act as a compound compensating diffraction-grating device, to avoid ghosting; the two blades of each sheet being fixed and permanently secured in predetermined relative positions.

In testimony whereof I have affixed my signature.

AUGUST P. JURGENSEN.